Patented Sept. 27, 1949

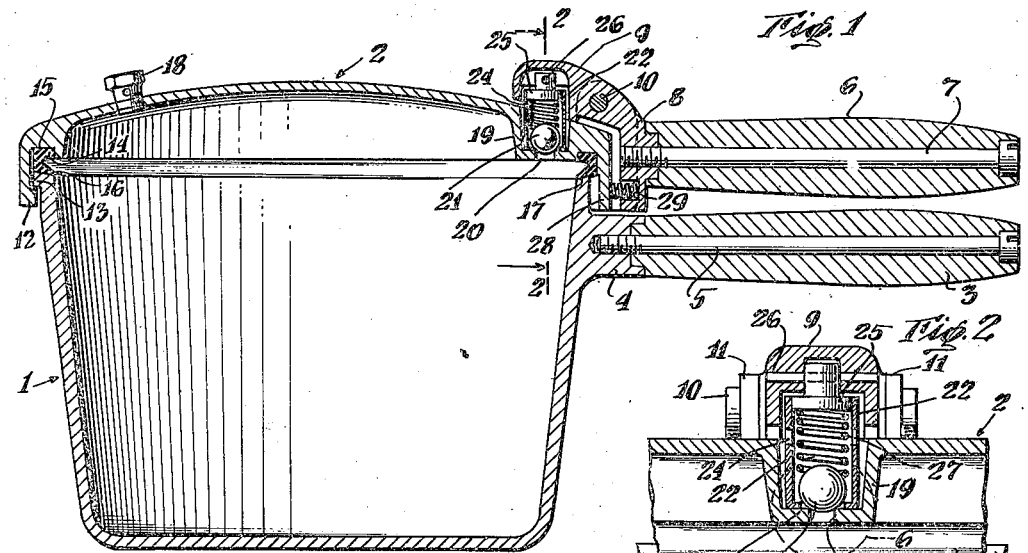
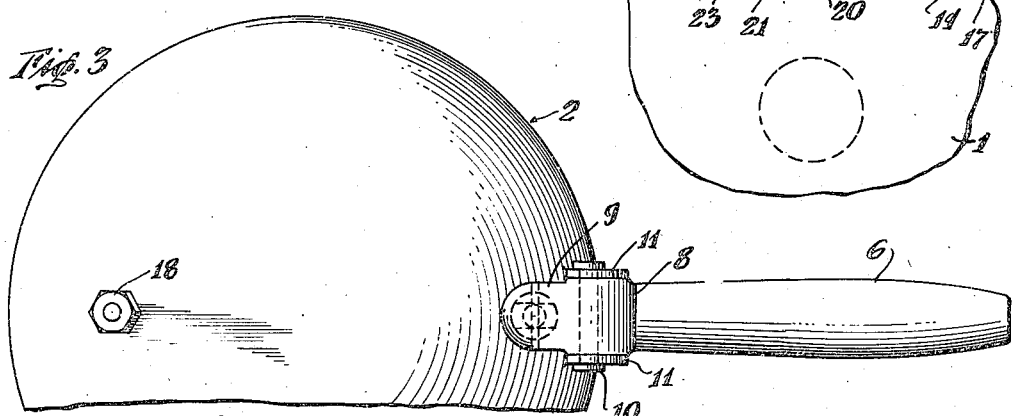
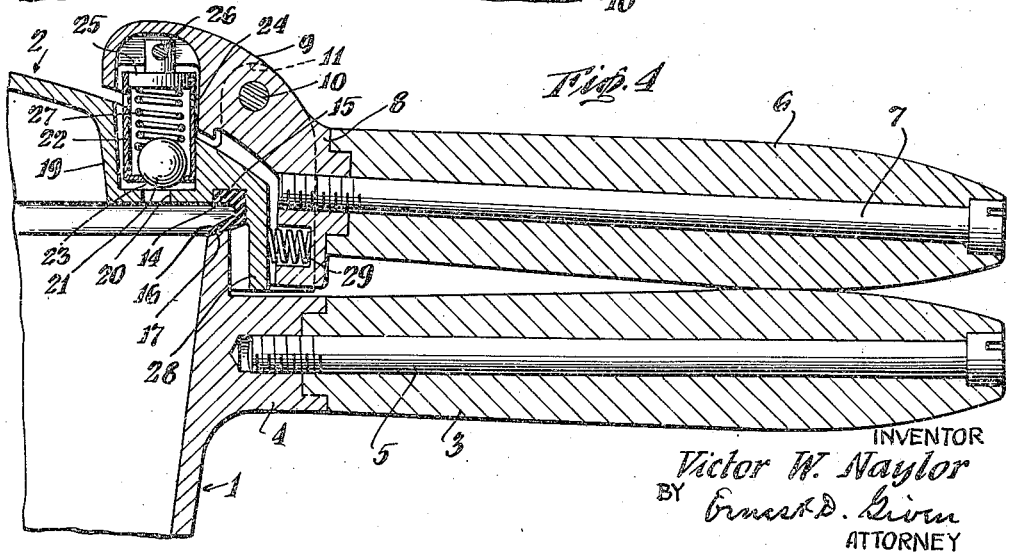

2,483,297

UNITED STATES PATENT OFFICE 2,483,297

PRESSURE COOKER

Victor W. Naylor, Arlington, N. J., assignor, by mesne assignments, to McGlynn Hays Industries, Inc., Belleville, N. J., a corporation of New Jersey Application March 16, 1946, Serial No. 654,892

4 Claims. (Cl. 220—55)

My present invention relates to pressure cookers such as those usable for ordinary household purposes, but is also applicable to similar devices of various sizes and shapes. More particularly, the present invention relates to combination safety valve means and positive venting means for the cooker effective automatically or by a simple manual operation at a time when the cooker is heated as in use.

It has been conventional for some time to provide pressure cookers with some type of safety valve means, usually including some resilient means for urging a valve onto its seat and wherein the resilient means is so designed that it will open automatically upon the internal fluid pressure, usually steam pressure, exceeding some predetermined amount, for example 15 pounds per square inch. The present invention incorporates such a device.

In the use of such cookers, however, following the usual cooking operation, there may or may not be a venting of some of the steam from the inside to the atmosphere. Whether or not such venting occurs, it is also quite usual, if not customary, for the cooker to be permitted to cool to some extent before opening it. Once this cooling has occurred, the steam which previously occupied substantially all the internal space condenses leaving a partial vacuum. In the past, this has created a condition such that the breaking of the vacuum has been difficult without opening the entire cooker; and this opening in turn, has been difficult by reason of the vacuum. As a result, substantial difficulties have occurred for the reason that no satisfactory means has been provided by which this vacuum may be positively and easily broken, particularly when the device is too hot to handle with bare hands. A primary object of the present invention is to provide means by which this vacuum may be simply and easily broken, and from a broader point of view, by which a passage may be positively opened between the inside and outside of the cooker so as to equalize the pressures and particularly so as to establish atmospheric pressure inside the cooker. This permits the easy opening of the cooker in the normal way provided.

A further detailed object of the present invention is to provide a means by which an additional automatic safety valve is provided, so that even should the spring normally used to urge the valve onto its seat stick for some reason, as by being fouled by matter accumulated therein from materials being cooked, or otherwise, there is yet another resilient means permitting the automatic unseating of the valve by excess of internal pressure without danger of explosion or injury to the apparatus itself or to users thereof.

Other and more detailed objects of the invention will become apparent from the following specification and appended claims when considered in connection with the accompanying drawings, in which:

Figure 1 is a view substantially in vertical section, showing a pressure cooker according to the present invention;

Fig. 2 is a fragmentary detail view, on an enlarged scale, substantially in vertical section on the line 2—2 of Fig. 1;

Fig. 3 is a plan view with a part broken away and omitted of the device of Fig. 1; and Fig. 4 is a fragmentary view, similar to a portion of Fig. 1 but on an enlarged scale.

Turning now to the accompanying drawings, wherein there is shown one embodiment of the present invention, the present invention is illustrated in connection with a pressure cooker including the pot element generally designated at 1 and a cover element generally designated at 2. Rigidly associated with the pot element 1 is a handle 3, including a non-heat conducting portion, which is secured to a boss 4 by a central threaded bolt 5 or in some other suitable way.

Associated with the cover element 2 is a somewhat similar handle 6, including a non-heat conducting grip portion, similar to the handle 3, and which is held by a bolt 7 to a depending portion 8 of a rocker arm 9, the latter being pivoted on a substantially horizontal axis pintle 10 to a pair of lugs 11 rigid or integral with the cover 2.

Means are provided for securing and sealing the cover element onto the pot element, such means comprising interlocking lugs on the cover and pot elements 2 and 1 respectively as shown at 12 and 13 (Fig. 1) and a substantially U-shaped gasket 14 carried in a recess 15 formed in the cover element 2 and having a lower flexible flange 16 adapted to bear on an annular sealing surface 17 formed on the pot element as shown. In the ordinary use of the cooker, the internal pressure effective within the recessed portion of the gasket 14 provides a tight seal between the flexible flange 16 of the gasket and the sealing surface 17.

At 18 there is shown a fusible or frangible plug device effective to fuse or break if the apparatus hereinafter described for venting internal pressure is for any reason totally inoperative, this plug device 18 being conventional in character and forming per set no part of the present invention.

Formed in one of the elements 1 or 2 is a valve-controlled passage means between the inside and the outside of the pot for the purpose of venting internal fluid pressure inside the pot upon that pressure exceeding a predetermined value, as during the ordinary use of the pot or for establishing atmospheric pressure inside the pot if a vacuum is formed therein upon the pot cooling after use. This passage means is preferably formed in a thickened or depressed portion 19 of the cover element 2 as shown in Figs. 1, 2 and 4, and provides an aperture 20 through a lower web of this depression, with which a suitable valve, here shown as a ball 21 is adapted to cooperate. The passage above the web in which the hole or aperture 20 is formed is of substantially larger cross section for purposes which will hereinafter appear, so that the upper edge or periphery of the aperture 20 serves in effect as a valve seat. Loosely surrounding the ball 21 is a perforated cage 22 which has a round hole 23 in its lower end portion smaller than the diameter of the ball 21, but sufficiently larger than the hole 20 as particularly shown in Fig. 2, so that when the cage is located in its lowermost or normal position as shown in Fig. 2, that is, with its lower portion resting upon the upper portion of the web in which the hole 20 is formed, the ball 21 will be out of contact with any part of the cage 22 and will rest on its seat as above described, closing the hole 20. The cage 22 also has one or more apertures 24 at its upper portion for the flow of fluid pressure therethrough in either direction. The cage 22 is rigidly secured at its upper end to a supporting member 25, which is pivoted to an inwardly extending portion of the rocker arm 9 on a substantially horizontal pintle 26. Extending between the member 25 and the ball 21 is a compression spring 27, which will thus exert a predetermined pressure upon the ball when the cage 22 is seated at its lowermost position as shown in Fig. 2.

At this position of the parts, the compression of the spring 27 is such as will be sufficient to oppose all ordinary pressures within the cooker. At the same time, if the fluid pressure within the cooker should reach a certain predetermined maximum (such as 15 pounds per square inch), this pressure will serve automatically to unseat the ball 21 by compressing the spring 27 and to permit such excessive fluid pressure to be vented through the apertures 20, 23 and 24. When, therefore the cage 22 is seated at its lowermost position as shown in Fig. 2, there is provided in effect an equivalent of the conventional pressure relief valve used heretofore with cookers of this type.

Disposed between the lower end of the depending portion 8 of the rocker arm 9 and a depending portion 28 of the cover element 2 is a compression spring 29 which is somewhat heavier than the spring 27 and serves normally to hold the handle 6 in its usual or upper position, that is, as shown in Fig. 1 and with the valve parts in the position shown in Fig. 2. If then it be assumed that the pot has been used and has cooled, so that there will be a partial vacuum created by the condensation of steam in the pot, and it is desired to break this vacuum by positively unseating the ball 21, the handle member 6 may be moved downwardly about the axis of its pintle 10, that is in a clockwise direction as seen in Figs. 1 and 4, compressing the spring 29 and positively moving the pintle 26 in a generally upward direction. This will move the cage 22 upwardly, which is permitted by the loose fit of the cage in the enlarged counterbore in the depression 19, and cause the sides of the hole 23 to engage the ball 21, so as positively to move the latter upwardly off its seat. By reason of the length of the handles 6 and 3, there is sufficient leverage available without requiring the application of excessive force to permit this operation, so as to break the vacuum within the pot. At this time with the parts in the position shown at Fig. 4, air pressure from the atmosphere may enter the pot around the outside of the cage 22 through the aperture 20 as shown to establish substantially atmospheric pressure in the cooker. Thereafter, and as the vacuum has been broken, it will be easily possible to remove the cover from the pot as by a relative angular movement of the handles 3 and 6 about the vertical axis of the pot and the subsequent removal of the cover element 2 in the usual manner.

The above construction not only provides for positively breaking the vacuum as aforesaid, but also affords an additional safety device not available in prior constructions. For example, if the interior of the cage 22 and the space around the spring 27 should be fouled with matter accumulated therein from the use of the pot or otherwise, or for any reason the spring 27 should not yield to permit the unseating of the ball 21 by internal pressure, this internal pressure may be effective through the ball, the cage and its support, i. e., members 22 and 25 and the rocker arm 9 to compress the spring 29, so as to unseat the ball by compression of this spring and automatically cause a movement of the ball and its cage to the position shown in Fig. 4. At this time, internal pressure could escape around the cage in the same way described for the breaking of vacuum. In other words, the position of the parts shown in Fig. 4 will effect an equalization of the pressure inside and outside of the pot, which in the ordinary case is the establishment of substantially atmospheric pressure in the pot, whether the movement of the parts to the position of Fig. 4 be the automatic result of internal pressure, effective on the ball 21, or the result of manual force applied to the handle 6.

While there is herein shown and described but one embodiment of the present invention, it will be obvious to those skilled in the art that other variants of the apparatus set forth herein may be produced based upon the present teaching. I do not wish to be limited, therefore, except by the scope of the appended claims, which are to be construed validly as broadly as the state of the prior art permits.

What is claimed is:

1. A pressure cooker, comprising a pot element and a cover element, handle means connected to each of said elements, means for removably securing and sealing said cover element onto said pot element against internal fluid pressure during the use of said cooker, the last named means being so constructed and arranged that when said cover element and said pot element are sealed in their position for use, the handle means connected to such elements respectively are in substantially vertical alignment, valve-controlled passage means in said cover element including a spring pressed valve constructed and arranged to open automatically upon the pressure inside said cooker exceeding a predetermined value, means mounting the handle means connected to said cover element for limited swinging movement in a substantially vertical plane in respect to said cover element, and means mechanically interconnecting this handle and said valve for positively unseating said valve upon predetermined relative vertical movement of said handle means.

2. A pressure cooker, comprising a pot element and a cover element, handle means connected to each of said elements respectively, means for removably securing and sealing said cover element onto said pot element against internal fluid pressure during the use of said cooker, means forming a passage through said cover element and providing a valve seat therein, a valve ball cooperating with said seat, a spring for resiliently urging said ball onto said seat and adapted to yield upon the ball being unseated by the internal pressure in said cooker exceeding a predetermined amount, a cage surrounding said ball and spring and arranged normally to be out of a position which will interfere with said ball engaging said seat under the action of said spring, and means mechanically connecting said cage and the handle means associated with said cover element for raising said cage so as positively to move said ball off said valve seat upon relative movement between said cover element and the handle means connected therewith.

3. A pressure cooker, comprising a pot element and a cover element, a handle rigidly connected to said pot element, a handle pivotally associated with said cover element for limited movement in respect thereto about a substantially horizontal axis, means for removably securing and sealing said cover element onto said pot element against internal fluid pressure during the use of said cooker, means forming a passage through said cover element and providing a valve seat therein, a valve cooperating with said valve seat, a spring for urging said valve onto its seat, but adapted to yield upon the fluid pressure within said cooker exceeding a predetermined amount, mechanical means connected to said handle connected to said cover element for positively unseating said valve in response to relative pivotal movement between said handle and said cover element, and means for resiliently urging such handle to a predetermined position in respect to said cover element, such that the means for positively unseating said valve will normally be inoperative to effect such unseating, but will be operative positively upon pivotal movement of said handle in respect to said cover element in opposition to the last named resilient means.

4. A pressure cooker, comprising a pot element and a cover element, a handle rigidly connected to said pot element, a handle pivotally connected to said cover element for limited movement in respect thereto about a substantially horizontal axis, a means for removably securing and sealing said cover element upon said pot element against internal fluid pressure during the use of said cooker, means forming a passage through said cover element and providing a valve seat and an enlarged counterbore portion therein, a ball valve cooperating with said seat, a cage located in said counterbore portion and pivotally connected to the handle connected to said cover and arranged partly to surround said ball, a compression spring inside said cage bearing on said ball tending to urge it toward its seated position on said valve seat, and a compression spring extending between a portion of said handle connected to said cover element and a part rigid with said cover element for urging said handle toward one end of its limited path of movement, the aforesaid parts being so constructed and arranged that the second named spring is heavier than the first named spring, so that the unseating movement of said ball normally automatically compresses the first named spring, and that such unseating movement may be effected by compression by the second named spring, so that relative manually-effected movement between the handles connected to the cover and pot element respectively will effect movement of said cage to move said ball positively off its seat so as to equalize pressures inside and outside said said cooker.

VICTOR W. NAYLOR.

REFERENCES CITED

The following references are of record in the file of this patent:

UNITED STATES PATENTS

| Number | Name | Date |
| --- | --- | --- |
| 625,338 | Kolben | May 23, 1899 |
| 796,392 | Bailey | Aug. 1, 1905 |
| 844,272 | Fate | Feb. 12, 1907 |
| 1,105,359 | Martens | July 28, 1914 |
| 1,326,124 | Vischer | Dec. 23, 1919 |
| 2,436,566 | Goldberg | Feb. 24, 1948 |

Certificate of Correction

Patent No. 2,483,297 September 27, 1949

VICTOR W. NAYLOR

It is hereby certified that errors appear in the printed specification of the above numbered patent requiring correction as follows:

Column 2, line 55, for "per set" read *per se*; column 5, line 31, for the words "associated with" read *connected to*; column 6, lines 33 and 34, for "element" read *elements*;

and that the said Letters Patent should be read with these corrections therein that the same may conform to the record of the case in the Patent Office.

Signed and sealed this 24th day of January, A. D. 1950.

[SEAL]

THOMAS F. MURPHY,
*Assistant Commissioner of Patents.*